United States Patent [19]
Freeman

[11] Patent Number: 6,020,980
[45] Date of Patent: Feb. 1, 2000

[54] FACSIMILE DELIVERY TO ELECTRONIC MAIL

[75] Inventor: Michael B. Freeman, Colorado Springs, Colo.

[73] Assignee: MCI Communications Corporation, Washington, D.C.

[21] Appl. No.: 08/723,750

[22] Filed: Sep. 30, 1996

[51] Int. Cl.[7] .............................. H04N 1/00; H04M 11/00
[52] U.S. Cl. ................ 358/402; 379/93.24; 379/100.08; 379/100.13
[58] Field of Search .............................. 379/93.17, 93.24, 379/93.23, 100.01, 100.08, 100.12, 100.13; 358/402

[56] References Cited

U.S. PATENT DOCUMENTS

| | | | |
|---|---|---|---|
| 4,941,170 | 7/1990 | Herbst | 379/100 |
| 4,996,704 | 2/1991 | Brunson | 379/93.24 |
| 4,996,707 | 2/1991 | O'Malley et al. | 379/100.13 |
| 5,091,790 | 2/1992 | Silverberg | 358/434 |
| 5,193,110 | 3/1993 | Jones et al. | 379/94 |
| 5,247,591 | 9/1993 | Baran | 382/61 |
| 5,349,636 | 9/1994 | Irribarren | 379/89 |
| 5,408,333 | 4/1995 | Kojima | 358/402 |
| 5,479,411 | 12/1995 | Klein | 370/110.1 |
| 5,513,126 | 4/1996 | Harkins | 358/402 |
| 5,577,108 | 11/1996 | Mankovitz | 358/402 |
| 5,675,507 | 10/1997 | Bobo, II | 364/514 R |

OTHER PUBLICATIONS

"Facsimile Mail System As Basis for Integrated Mail System"; ISS, 1984; pp. 1–7.

*Primary Examiner*—Jerome Grant, II

[57] ABSTRACT

A system and method is provided for delivering facsimile messages to electronic mail addresses as object files attached to or inserted within e-mail messages. A facsimile server device is provided with a facsimile modem for receiving facsimile calls. The facsimile server device includes various application file translation software programs for translating the facsimile object files to subscriber selected formats. In operation, an e-mail subscriber also subscribes to a facsimile-delivery-to-electronic-mail system and is issued a specially designated phone number for receiving facsimile transmissions. The subscriber selects a file translation format in accordance with a software application program which the subscriber uses. The facsimile server device receives and demodulates the facsimile transmission and stores it as an object file in the native facsimile format. The facsimile server device then queries a subscriber database for translation of the dialed phone number to an e-mail address. The subscriber database query also provides a subscriber selected file format which the facsimile file is to be translated into prior to sending to the subscriber. The facsimile server device creates an e-mail message addressed to the e-mail address and translates the native facsimile object file to the format file specified by the subscriber database. The facsimile server device attaches the translated object file to the electronic mail message, or inserts it within, and sends the electronic mail message to the subscriber.

20 Claims, 6 Drawing Sheets

FACSIMILE DELIVERY TO ELECTRONIC MAIL

BACKGROUND OF THE INVENTION

1. Field of the Invention

The present invention relates generally to facsimile transmissions and, more particularly, to facsimile transmissions to electronic mail systems.

2. Related Art

Two popular forms of communication are electronic mail (e-mail) and facsimile transmission.

In an e-mail system, communication is provided between two or more computer terminals. Each computer terminal includes software for sending and receiving e-mail which typically includes the ability to reply to and/or forward received e-mail messages. These terminals may be coupled through a public telephone network employing modems, through a LAN or WAN network, or some combination of the above. E-mail permits transmission of text. E-mail also permits attachments such as text or graphic files to be included or attached to an e-mail message.

Typically, an e-mail system is controlled by a central system. The central system may be a PC or mainframe or some other computing system. This central system serves to receive e-mail messages, and store them. When a user wishes to receive e-mail messages, the user logs onto the central system and retrieves any stored messages. Thus, a user is able to retrieve received e-mail messages from any site where the user has access to a computer terminal which can connect to the central computing system. An e-mail sender, therefore, does not have to know where the receiver is or will be when the receiver wishes to receive messages. Rather, a sender always sends e-mail messages to a receiver's address, and the receiver can retrieve that message from any desired PC.

In facsimile transmission, a text and/or graphic document is transmitted from a first facsimile machine to a second facsimile machine, typically over a telephone network such as a public telephone network. Typically, the first facsimile machine converts a document into a facsimile transmission format and transmits the document over the telephone system to the second facsimile or receiving facsimile machine. Upon receipt, the second facsimile machine immediately prints out a hard copy of the received document.

Alternatively, a PC may be employed for the sending and/or the receiving facsimile machine. Where a PC is employed, the PC must be provided with a facsimile compatible modem and translation software for converting a document from and to a facsimile transmission format.

Whether a conventional facsimile machine or a PC is employed, a facsimile receiver must provide the facsimile sender with a telephone number to send the facsimile to. The facsimile sender, thus, must know precisely where the receiver will be located in order to receive a transmission. This is especially inconvenient for business travelers who, in order to receive facsimile transmissions, must supply facsimile numbers at a work location and possibly at a hotel. Where a hotel facsimile machine is used, for example, the receiver must provide the sender with the facsimile telephone number of the hotel. The receiver must also, typically, pay a charge for use of the hotel facsimile machine and relinquish confidentiality when using the hotel's public facsimile machine.

Although e-mail systems have many advantages over facsimile transmission systems, there are still, nevertheless, instances where facsimile transmission is desired over e-mail transmission. This includes cases where a receiver desires a duplicate copy of an original document, such as a contract or other document having a signature. Ideally, therefore, an electronic transmission system would combine the capabilities of an e-mail system and facsimile transmission systems, so that facsimile transmissions are attached to or incorporated into an e-mail transmission. Preferably, facsimile files attached to or incorporated into e-mail messages are converted in route to the receiver to a file format preferred by the receiver. In that way, a receiver would not need to add any additional software to the receiver's PC for receiving facsimile transmissions.

U.S. Pat. No. 4,837,798, issued to Cohen el al., is directed to a unified messaging system for providing a single electronic mailbox for different types of messages. A central mailbox is provided for receiving and storing e-mail, voice mail and facsimile transmissions. Means are provided for alerting a mailbox owner whenever text, voice or facsimile data has been received by the unified mailbox. The mailbox owner can then retrieve the message through several means. For instance, an e-mail user can create a meeting notice and send it to several people. Subscribers may or may not be e-mail users. Instead, a subscriber may receive the meeting notice from the United States Postal Service via an electronic paper mail gateway, through text-to-speech conversion or by calling the message center agent. Thus, message senders are able to create a message without knowing the sender's retrieval system or retrieval device. Cohen et al, however, does not teach conversion of facsimile files to various application formats. Nor does Cohen et al. teach attaching facsimile transmissions to e-mail messages or sending a facsimile transmission to an e-mail address.

U.S. Pat. No. 4,996,707, issued to O'Malley et al., is directed to a text-to-speech converter for a facsimile graphic image. The system includes a computer system for receiving and storing graphic images from remote facsimile machines. This system also includes OCR software for converting graphic images of textual material into an ASCII coded file. A text-to-speech converter is also provided for converting the ASCII coded file into speech. O'Malley et al., however, does not teach to send the ASCII converted file to an e-mail address nor does it teach to convert non-textual facsimile files into various application formats.

U.S. Pat. No. 4,941,170, issued to Herbst, is directed to a facsimile transmission system for transmitting documents over telephone lines using an e-mail system. Briefly, one or more facsimile machines are connected to an e-mail system through a facsimile controller. An e-mail system may include multiple individual computers. For each facsimile machine or each group of facsimile machines, a separate facsimile controller is provided. The facsimile controller is used for identifying incoming facsimile transmissions. Upon receipt of an incoming facsimile transmission, the facsimile controller decodes information from the facsimile transmission for storage in the e-mail system. Once the facsimile transmission is in the e-mail system, it may be transferred among the various computers in the e-mail system. The facsimile transmission stored in the e-mail system can be printed out on any conventional facsimile machine provided that the facsimile machine is coupled to the e-mail system through a facsimile controller. Herbst does not, however, teach to convert an incoming facsimile transmission into a format for display on a computer monitor within the e-mail system. Instead, the e-mail system is simply used as a means for storing and retransmitting a facsimile transmission from one conventional facsimile machine to another conventional facsimile machine.

E-mail systems and facsimile systems, thus, are still effectively segregated. A customer uses an e-mail account, e-mail address, and PC/modem to receive e-mail messages. They also must use a facsimile telephone number and a facsimile machine to receive facsimile messages. Alternatively, a customer may use a PC equipped with a facsimile modem and facsimile software to receive facsimile transmissions, thus eliminating the need for a facsimile machine. But they must still have access to a terminating telephone number (or calling station identifier) to receive the facsimile, must still have a facsimile modem and specialized facsimile software, and must still utilize two different network access methods to receive both an e-mail message and a facsimile message.

Additionally, a facsimile receiver must provide the facsimile sender with a telephone number to send the facsimile to. This means multiple telephone numbers must be used for multiple locations. If the receiver is at a hotel, for example, they must provide the sender with the facsimile telephone number of that hotel. They must also pay a charge for use of the hotel facsimile machine (if used), and give up confidentiality for using a public facsimile machine.

What is needed, therefore, is a method and system for delivering a facsimile transmission to an e-mail system pre-converted into an application format desired by a receiver for display on the receiver's computer. In this way, an e-mail subscriber could receive facsimile transmissions of facsimile and/or graphic data for display on the user's terminal and for retransmitting to other e-mail subscribers or to conventional facsimile machines.

SUMMARY OF THE INVENTION

A system and method is provided for delivering facsimile messages, generated by facsimile devices, to an electronic mail (e-mail) address as an object file attached to an e-mail message. The object file may be any of a variety of types of graphical image files, as selected by the receiver.

One advantage of the present invention is the ability to receive facsimile messages and e-mail messages at same time, using the same outbound e-mail retrieval call and the same network access method.

Another advantage of the present invention is that a facsimile subscriber does not need a facsimile device, a facsimile modem or facsimile software to receive facsimile transmissions. Since e-mail is generally more accessible than facsimile devices and more confidential than public facsimile devices such as those in hotels, retrieval of facsimile messages through e-mail systems is especially useful. The present invention thus eliminates the need for access to a terminating telephone number (or calling station identifier) to receive facsimiles. Instead, only an outbound call from any location to an e-mail account is sufficient for retrieving facsimile transmissions. The present invention thus eliminates need for different telephone numbers to receive facsimile messages at different locations. A single telephone number may be used no matter where the subscriber is because the telephone number is mapped to an e-mail address which will reach the subscriber anywhere in the world. This serves as an "anywhere, anytime" feature of reaching subscribers.

Yet another advantage of the present invention is the reformatting of facsimile transmissions into subscriber selected object file formats. By reformatting facsimile transmissions prior to sending the facsimile file to an e-mail system, subscribers can utilize whatever software they already have, including some e-mail client programs that can display graphical images, without additional software.

Yet another advantage of the present invention is that by storing facsimile transmission in e-mail systems, facsimile messages can be retrieved as e-mail by the subscriber at the convenience of the subscriber. Facsimile messages may also be forwarded as e-mail. The present invention thus serves as an intrinsic facsimile store-and-forward feature.

Yet a further advantage of the present invention is that facsimile messages can be sent to multiple subscribers by using an e-mail distribution list. This serves as a facsimile broadcast feature.

Yet another advantage of the present invention is the provision of an option for receiving facsimile messages as ASCII text inserted in the body of an e-mail message.

In a preferred embodiment, when a facsimile transmission is sent out over a public telephone network as a telephone call, the transmission is routed to a facsimile server device. The facsimile server device demodulates the facsimile transmission and stores it as an object file in the native facsimile format. The facsimile server device then queries a subscriber database for translation of the dialed phone number to an e-mail address. The subscriber database query also provides a subscriber selected file format which the facsimile file is to be translated into prior to sending to the receiver.

The facsimile server device creates an e-mail messages addressed to the translated e-mail address and translates the native facsimile object file to the format file specified by the subscriber database. The facsimile server device attaches the translated object file and send the e-mail message to the receiver or subscriber.

The facsimile server device uses a specially named e-mail account from which to send the e-mail message. In this way, the subscriber receives the e-mail message from a specially named account, indicating that the message originated as a facsimile transmission.

An e-mail subscriber also subscribes to a facsimile-delivery-to-electronic-mail system. The subscriber is issued a specially designated phone number for receiving facsimile messages via e-mail. This designation is made by the service provider at the request of the subscriber, or facsimile receiver, and may be transparent to the sender. The e-mail subscriber or facsimile receiver specifies a file format to which a native facsimile object file is to be translated. Examples of such applications include Microsoft Powerpoint, Lotus Freelance, Shapeware Corporations Visio, Corel Draw, JPEG, Microsoft Paintbrush, etc. The native facsimile object file may also be converted to a standard bit map which is readable by most common graphics applications. There are also some e-mail client applications, such as Microsoft Exchange and Lotus Notes, that are capable of reading and displaying facsimile transmitted graphic images. In these cases, no translation, or at most, simply transmitting to a bit map, will be required. Alternatively, the facsimile receiver may specify that the object file remain in native facsimile format to be used by the subscriber employing a facsimile application.

A facsimile server device is provided with a facsimile modem for receiving facsimile calls which are demodulated and stored as an object file in a database. A facsimile server is equipped with various application file translation software programs for translating native facsimile files to subscriber selected formats. A file translation specification is based on a subscriber request, according to the software application that the subscriber uses. For example, if the subscriber uses Microsoft Exchange or Lotus Notes, or other e-mail client applications capable of displaying graphic images, the subscriber will request no translation. Likewise, if the subscriber uses facsimile software on their computer, the subscriber may request no translation. If, however, the subscriber uses Visio, for example, the subscriber may request translation to a Visio format. A subscriber may also request translation to a bit map, which is readable by most common graphics applications.

By reformatting facsimile transmissions before re-transmitting the facsimile to an e-mail system of a subscriber, the subscriber may use whatever software they already have without needing to purchase additional software.

By sending the facsimile to an e-mail server, the e-mail server will store the facsimile message as an e-mail message until the subscriber downloads it at the subscriber's command. This serves the function of conventional facsimile store and forward systems, which eliminate the need for the subscriber to be available at the time the facsimile call is made. It also allows the subscriber to receive the facsimile message from any location without the sender having to know where the subscriber is.

The facsimile server may also include graphic scanning software for reformatting facsimile text into ASCII text files. Converted ASCII text may then be inserted into the body of an e-mail message.

A voice response unit (VRU) may be employed so that a subscriber may call the VRU and enter a destination number to which the facsimile object file should be forwarded to. In this way, the subscriber can forward the facsimile to another e-mail address, an actual facsimile device, or any telephone number.

A VRU may also be employed for subscriber format selections. File translation specifications thus may be multi-valued and dynamic since subscribers can simply call a VRU and select any format they wish their facsimile object files to be translated into. This selection may be changed at any time.

Further features and advantages of the present invention, as well as the structure and operation of various embodiments of the present invention, are described in detail below with reference to the accompanying drawings.

BRIEF DESCRIPTION OF THE FIGURES

The present invention is described with reference to the accompanying drawings. In the drawings, like reference numbers indicate identical or functionally similar elements. Additionally, the leftmost digit of a reference number identifies the drawing in which a reference number first appears.

DETAILED DESCRIPTION OF THE PREFERRED EMBODIMENTS

In a facsimile delivery to electronic mail (e-mail) system, a subscriber subscribes to a conventional e-mail system and to a facsimile-to-e-mail system. The subscriber is provided with an e-mail address from the e-mail system and with a standard telephone number from the facsimile-to-e-mail system. The telephone number is specially designated by the facsimile-to-e-mail service provider for receiving facsimile transmissions. The telephone number is used by facsimile devices for sending facsimile transmissions to the subscriber via a facsimile server device of the service provider.

In operation, upon receipt of a facsimile transmission, the facsimile server device stores the received facsimile transmission as an object file. The facsimile server device retrieves a record format associated with the dialed phone number. The record format includes an e-mail address associated with the dialed telephone number and a subscriber-selected file translation specification. The facsimile server device then converts the stored object file into the subscriber-selected file format.

The facsimile server device creates an e-mail message to the subscriber's e-mail address. If the selected file conversion format is a graphic format, the facsimile server device attaches a copy of the reformatted graphic file to the e-mail message and sends the e-mail message to an e-mail server of the subscriber. If the selected translation format is a text file format such as an ASCII formatted text file, the facsimile server device may either attach the reformatted file to the e-mail or insert the converted text into the e-mail message itself The e-mail message is then sent to the e-mail address of the subscriber.

Upon receipt of the e-mail by the e-mail system of the subscriber, the subscriber may retrieve the file as any other e-mail message. The subscriber may than view the facsimile message through existing software since the facsimile has been reformatted to a selected format. The user may also forward the message to other users. After the subscriber opens the attached file through an existing applications program, the subscriber may incorporate the file or parts of it into any other document. Preferably, the subscriber can also send e-mail messages back to the system for conversion to a facsimile format and transmission to a facsimile device.

In this way, a subscriber is able to receive and view facsimile transmissions on a PC using the subscriber's existing software. No additional client software is required. The subscriber, as a customer of the service provider, may use whatever software they already have and simply request the service provider to translate their facsimile calls into a desired file format. The service provider may offer whatever application translations available. Many translation programs are currently available.

Figure 1:
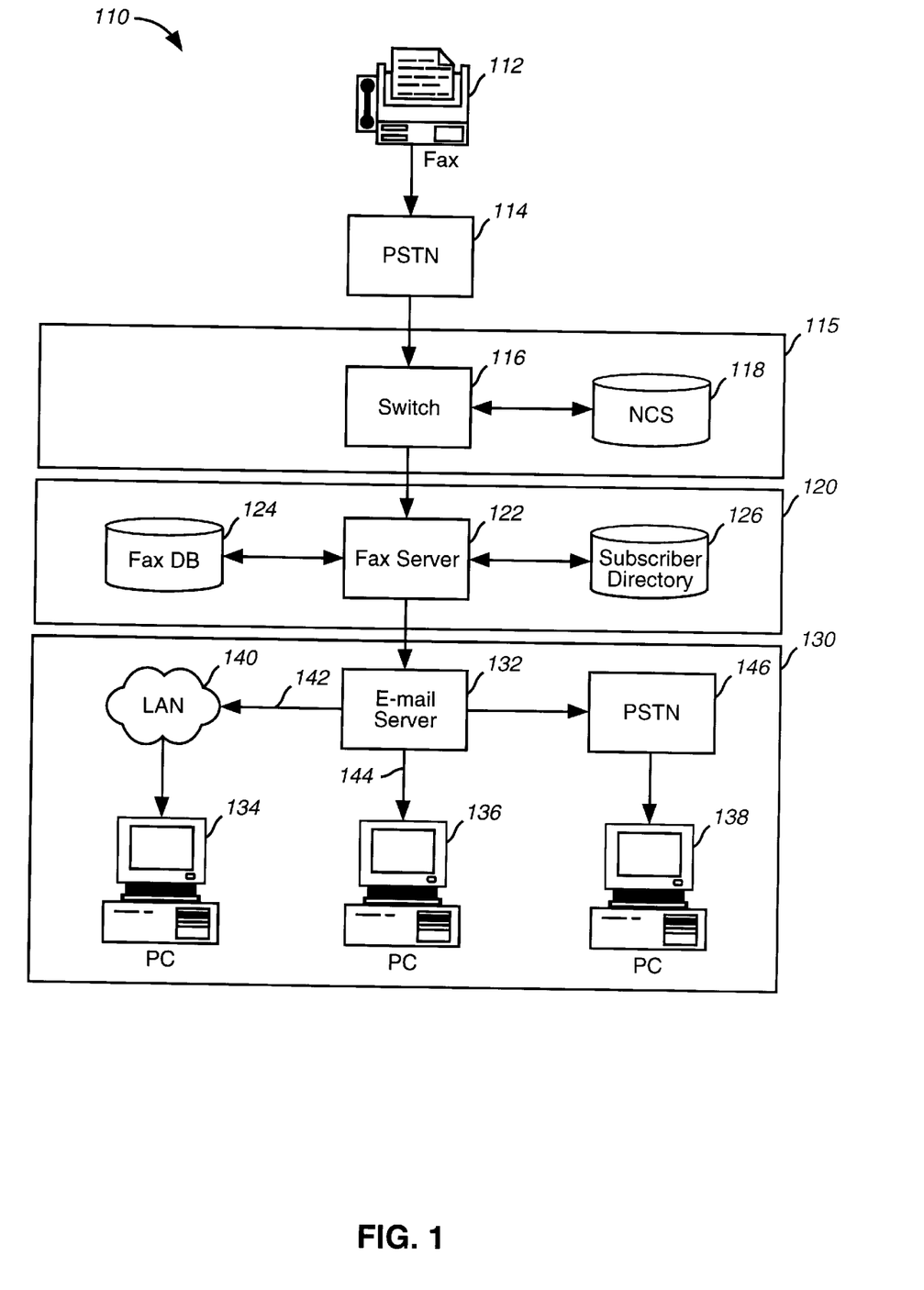
FIG. 1 is a block diagram of a facsimile to e-mail deliver system, in accordance with the present invention.

Referring to FIG. 1, a block diagram illustrating a systems architecture of a facsimile delivery to e-mail system 110 is shown. An originating facsimile device 112 dials a standard telephone number that is specially designated for receiving facsimile messages via e-mail. This designation is made by the service provider, at the request of the customer (subscriber), and may be transparent to the sender. Alternatively, the facsimile device may dial a 1-800 number or a Virtual Private Network (VPN) number. Facsimile device 112 may be a conventional facsimile machine or a computer terminal provided with a facsimile modem and facsimile software.

By employing a standard telephone number, facsimile transmission are sent to e-mail systems using a single stage dialing sequence so that the facsimile transmitter transmits facsimiles in a conventional manner. Thus two stage dialing is not required. This permits worldwide submissions of facsimile transmissions to e-mail systems. Moreover, by transmitting facsimiles to an e-mail system through a single phone number, subscribers are able to retrieve facsimile transmissions from anywhere an e-mail account or telephone network may be accessed.

Facsimile device 112 is coupled to a network routing system 115. The coupling may be via a public telephone network (PSTN) 114. PSTN may include a combination of local exchange carriers and interexchange carriers. Alternatively, the coupling may be via the Internet. In fact, any coupling which supports e-mail messaging may be used.

Network routing system 115 receives facsimile transmissions which are sent to specially designated telephone numbers supplied to subscribers by service providers. System 115 routes these calls to appropriate facsimile server devices provided by service providers. Preferably, system 115 includes a network switch 116 for routing incoming facsimile transmissions to appropriate facsimile server devices.

Upon receipt of a facsimile call, network switch 116 queries a database such as network control system (NCS) 118. NCS 118 performs a conventional number translation which translates the dialed number to a network routing address which designates termination to a facsimile server device 120. This network address is returned to switch 116 which proceeds to route the facsimile transmission to facsimile server device 120.

Facsimile server device 120 includes necessary hardware and software for receiving facsimile transmissions from facsimile device 112, for reformatting facsimile transmissions into subscriber selected computer file formats and for sending reformatted files to e-mail systems, such as e-mail system 130.

E-mail systems such as system 130 include a number of computer terminals connected to an e-mail server, such as e-mail server 132. E-mail server 132 receives e-mail messages from facsimile server device 120, from terminals 134, 136 and 138 and possibly from other sources, such as the Internet. E-mail server 132 stores received e-mail messages for later retrieval by e-mail subscribers. E-mail subscribers are provided with individual e-mail accounts and associated passwords for accessing e-mail server 132 from any of a variety of computer terminals, including terminals 134, 136 and 138.

Computer terminal 134 represents a typical workplace setting where a LAN 140 provides a link 142 between terminal 134 and e-mail server 132. Link 142 may be a direct connection or may be via a telephone network. Computer terminal 136 is provided with a direct connection 144 to e-mail server 132. A direct connection may be provided where, for instance, terminal 136 is located in the same facility as e-mail server 132. Terminal 138 accesses e-mail server 132 directly through a public telephone network 146. PSTN connection 146 may be employed at a work-place, at a home or where a user is away from the normal workplace such as, for instance, a hotel.

Referring back to facsimile server device 120, device 120 preferably includes a facsimile server 122 for receiving facsimile transmissions and for reformatting facsimile transmissions into subscriber selected formats. Facsimile server 122 preferably contains a facsimile modem (not shown) for receiving facsimile transmissions and translation software for reformatting facsimile transmissions into any of a variety of object file application formats. Examples of such application formats include Microsoft Powerpoint, Lotus Freelance, Shapeware Corporation's Visio, Corel Draw, JPEG and Microsoft Paintbrush. Facsimile server 122 may include translation software for converting native facsimile object files to standard bit maps which are readable by most common graphics applications. Facsimile server 122 may also include graphics scanning software for converting facsimile transmitted documents into text files, such as ASCII text files.

Subscribers may select a file translation specification from a list of file translation specification application programs stored in facsimile server 122. Examples of such applications include Microsoft Powerpoint, Lotus Freelance, Shapeware Corporations Visio, Corel Draw, JPEG, Microsoft Paintbrush, etc. Subscribers may also select a standard bit map format which is readable by most common graphics applications.

Alternatively, a subscriber may decline to select a file translation format where, for instance, the subscriber prefers to translate the facsimile object file at the subscriber's computer terminal. For example, if the subscriber uses Microsoft Exchange or Lotus Notes or other e-mail client applications capable of displaying graphic images, no translation is necessary since those applications can display graphic material stored in a facsimile format. Likewise, if the subscriber uses facsimile software on their PC, no translation is necessary.

Subscriber selections are stored in a memory associated with facsimile server 122, such as subscriber directory 126. Selections are linked to the specially designated telephone number which was assigned to the subscriber.

In operation, upon receipt of a facsimile transmission, facsimile server 122 demodulates the facsimile transmission and stores it as an object file. This object file is stored in a memory, preferably a facsimile database memory 124. Facsimile server 122 then queries a database, such as subscriber directory 126, for a record format containing a subscriber file translation specification and a subscriber e-mail address.

At a minimum, a record format includes fields for the dialed facsimile number and the subscriber e-mail address. This is sufficient if both facsimile server 122 and the e-mail address have accounts within the same e-mail system, or if the e-mail address by itself is accessible by the Internet. It may be necessary to include a routing address for an e-mail server of another e-mail system. A record format also includes a single-character field specifying the format for file translation. Since a single 8-bit character can represent up to 256 values, this should be sufficient for specifying all of the various application formats to be offered. If more are needed, this can be a two or three character field. The electronic mail address is of standard format which specifies the electronic mail system and the specific subscriber or subscriber account.

Table 1 is an example of a typical record format:

TABLE 1

| facsimile_number | email_address | emal_system_address | format |
|---|---|---|---|
| 7195551234 | 999-9999@mci.com | | B |

In this example, the facsimile telephone number is (719) 555-1234. This number, when dialed by a facsimile device 112, is translated in subscriber directory 126 to the e-mail address 999-9999@mci.com. Since this is an Internet address and can be used to reach a subscriber on any e-mail system via the Internet, no email_system_address is needed. The format specification "B" may refer to a specific application format, such as Microsoft Powerpoint, Visio, or bit map. This specification will be based on the subscriber's request to the service provider.

Subscriber directory 126 outputs the record format to facsimile server 122. Upon receipt of the record format, facsimile server 122 retrieves the facsimile object file from facsimile database 124. Facsimile server 122 performs the file translation, if any, as specified in subscriber directory 126. Preferably, facsimile server 122 compresses the reformatted file for faster transmission to e-mail system 130.

Following translation, facsimile server 122 creates an e-mail message to the subscriber. Where the selected translation specification is a graphic file format, the translated file is attached to the e-mail message which will then be sent to an e-mail server 132 for access by the subscriber. Where the selected translation format is an ASCII text file or some other text file, the translated text may be included in the body of an e-mail message which is sent to e-mail server 132 for access by the subscriber.

Where facsimile server 122 is connected to a subscriber e-mail system for Inter-Email system exchanges, facsimile server 122 simply transmits the e-mail message and attachment to the subscriber e-mail address. Facsimile server 122 may use a specially named e-mail account, such as "MCI Facsimile server", to indicate to the subscriber the fact that the e-mail message originated from a facsimile message. Preferably, to service multiple e-mail systems, the facsimile server 122 uses an Internet address as the "sender" of the e-mail messages. Any conventional e-mail system, MCI Mail for example, may be supported. Alternatively, several different e-mail systems may be supported simultaneously through the use of appropriate dialed number/e-mail address translations.

Where facsimile server 122 is not connected to a subscriber e-mail system for Inter-Email system exchanges, facsimile server 122 may be provided with an e-mail account and an associated e-mail address. This address typically includes a specific user name for accessing an e-mail system. This user name will be included in the "From" field of the e-mail message, thereby notifying the subscriber that the message is a converted facsimile from facsimile server 122. E-mail server 132 deposits the e-mail message within the subscriber's account, if the subscriber has an account with that particular e-mail system. If the subscriber's account is on another e-mail system, then e-mail server 132 sends the e-mail message to the appropriate e-mail system, preferably via the Internet. Facsimile messages are stored as e-mail messages until the subscriber retrieves or downloads the messages. The subscriber can retrieve e-mail messages from e-mail server 132 through any of terminals 134, 136 and 138, as well as through various other electronic messaging systems coupled to e-mail system 130 through, for example, the Internet.

Facsimile device 120 thus permits e-mail server 132 to act as a facsimile message store-and-forward system thus eliminating the need for subscribers to be available at the time a facsimile call is made. It also allows the subscriber to receive the facsimile message from anywhere without the sender having to know where the subscriber is.

Another distinct advantage provided by the present invention is that no specific client software is required of the subscriber. The subscriber, as a customer of the service provider using the present invention, may use whatever software they already have and simply request of the service provider to translate their facsimile calls to the appropriate file format. The service provider has the option of offering whatever application translations they wish; they simply need to include the appropriate translation program on the facsimile server 122, and include corresponding specification codes in the subscriber directory 126. Translation programs are commonly included with the graphic application products.

Preferably, an e-mail distribution list may be retrieved from subscriber directory 126 permitting a single facsimile message to be sent to multiple subscribers, similar to a facsimile broadcast feature.

Facsimile transmissions are generally regarded as graphics files so that a preferred translation specification are typically graphic application programs. In reality, however, most facsimile transmission contain text data only. In a preferred embodiment, therefore, subscribers may select to have facsimile transmissions reformatted into text files such as ASCII text files.

In order to translate a facsimile transmission into a text file, facsimile server 122 employs a graphics scanning software program for converting the graphical text in the facsimile image file to text, such as ASCII text. Generally, in such a reformatting, any non-text data in the facsimile file is lost. Where facsimile transmissions are converted into text files, such as ASCII text files, the text may be included in the body of the e-mail message where it can be read by virtually any e-mail client application. Alternatively, the text file could be attached as a separate file.

Preferably, the ANI of the originating facsimile call is passed onto the facsimile server 122. This is easily done by providing the facsimile server 122 with a standard SS7 interface to the Switch 116, or by the Switch 116 out-pulsing ANI digits to the facsimile server 122. Facsimile server 122 may then provide the originating ANI in the e-mail message as indication of who sent the facsimile. The Subscriber Directory may even be setup to perform limited ANI-to-name translations for customer selected frequent facsimile senders.

An interactive voice response unit (IVR) or voice recognition unit (VRU) may be included in facsimile server device 120 for permitting subscribers to re-route a facsimile file to another destination. An IVR receives signals representative of user input from a telephone unit, such a key pad, typically in DTMF format. A VRU receives signals representative of user voice responses. In either event, the received signals represent user instructions or user responses to prompts from the facsimile server device 120. The IVR or VRU interacts with facsimile server device 122 to perform functions based on the received signals. Through an IVR or VRU, a subscriber can simply instruct the system to forward a file to, for instance, a facsimile device. The subscriber can provide a destination phone number through keypad entries. In this way, the subscriber can forward the facsimile to another e-mail address, an actual facsimile machine, or any telephone number.

An IVR or VRU may also be employed in a facsimile server device 120 where file translation specifications are multi-valued and dynamic. A subscriber simply calls into the IVR or VRU and selects the format they wish their facsimile object files translated into. Subscribers may change this selection at any time.

In an alternative embodiment, e-mail address translations are performed in NCS database 118 rather than in subscriber directory 126. This is possible if the digit out-pulsing capability of the switch network 116 is sufficient for the format of the e-mail address. For example, if the e-mail address is entirely specified with seven digits, and the switch network 116 out-pulses seven digits (seven and ten digit out-pulsing is common), then NCS 118 returns a seven-digit e-mail address along with the routing address for facsimile server 122. Switch 116 routes the call to facsimile server 122 and out-pulses the seven-digit e-mail address. Facsimile server 122 may then proceed to create the e-mail message.

Figure 2:
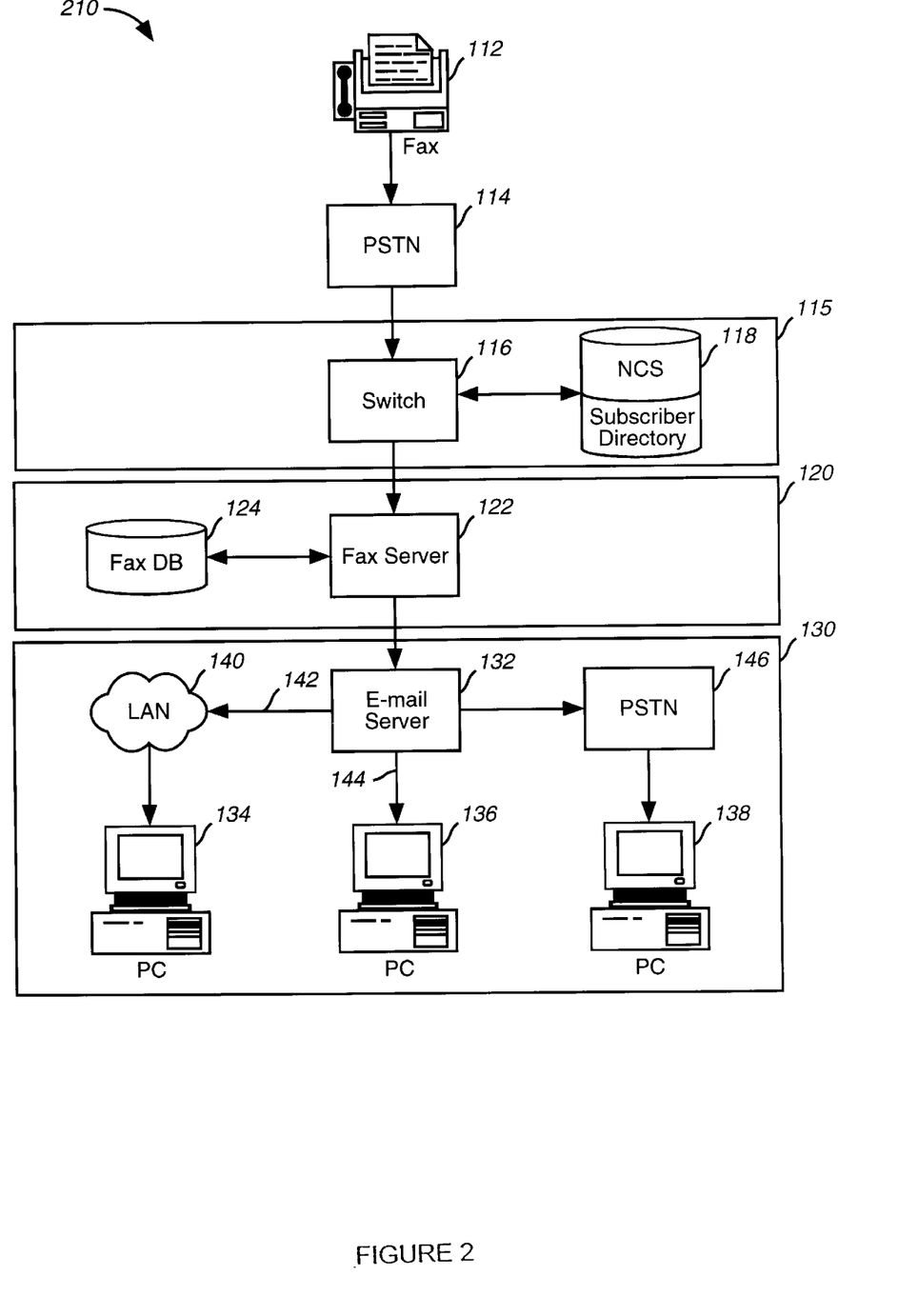
FIG. 2 is a block diagram of an alternative embodiment of a facsimile to e-mail deliver system, in accordance with the present invention.

NCS 118 may also out-pulse additional digits to specify the file translation format. In that event, subscriber directory 126 may be eliminated altogether in place of a subscriber sub-directory within NCS 118, as shown in FIG. 2.

Figure 3A:
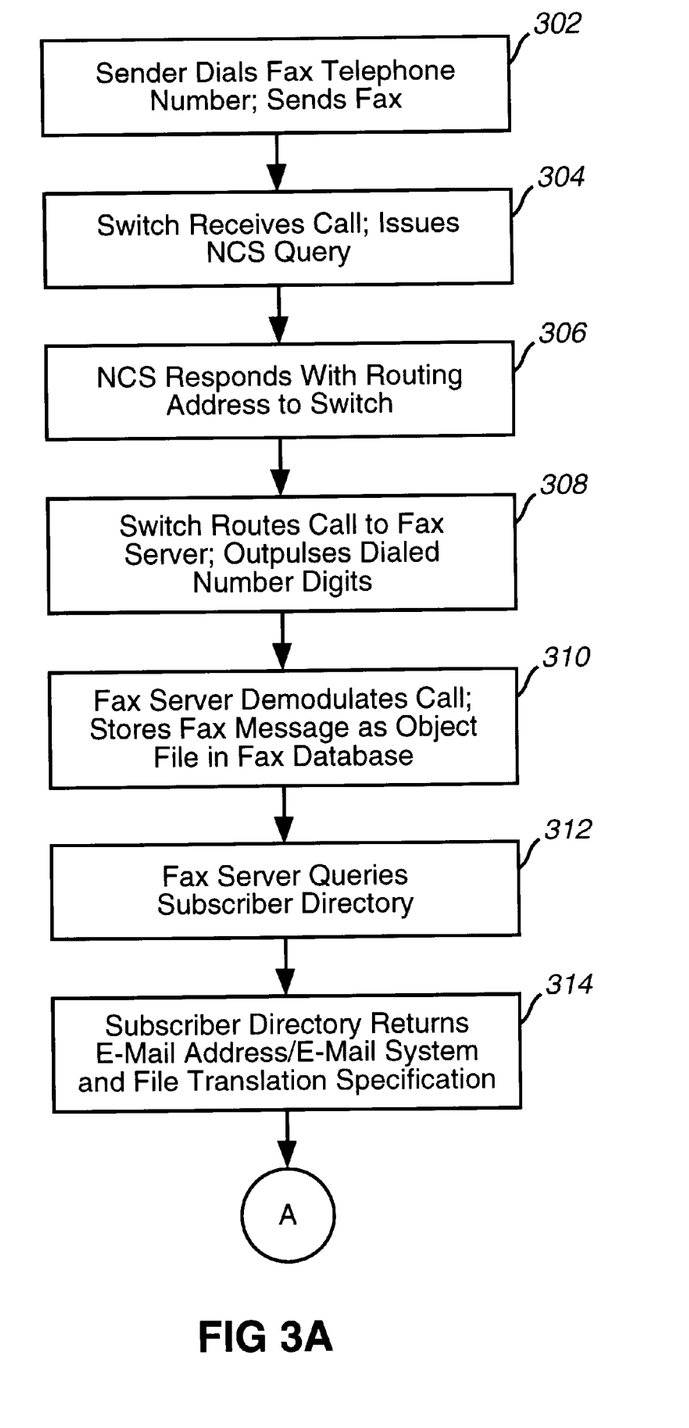
FIGS. 3A and 3B provide a sequence of events flow diagram illustrating a method of delivering facsimile transmissions to e-mail systems, in accordance with the present invention.
Figure 3B:
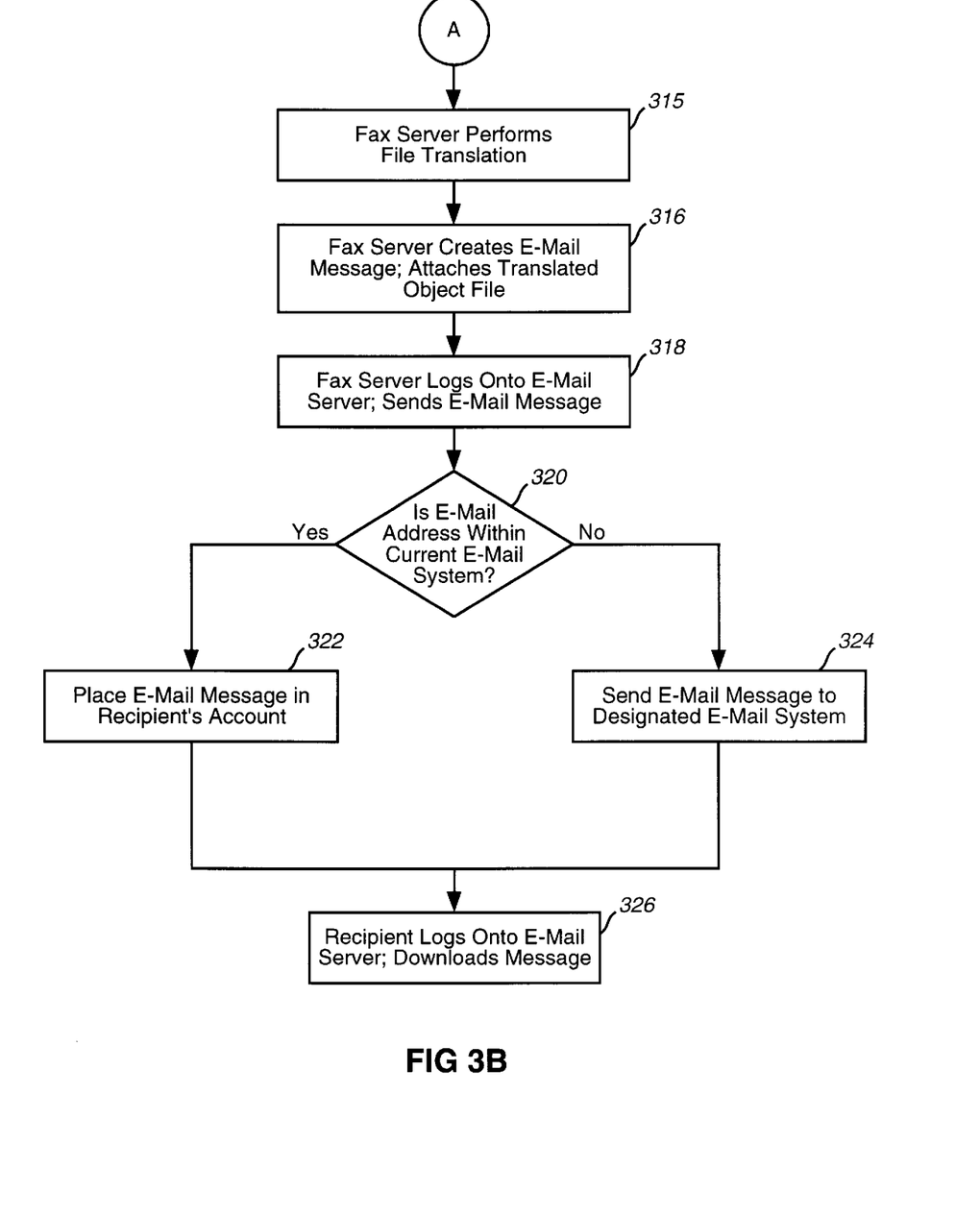

Referring to FIGS. 3A and 3B, a process flowchart is provided for illustrating the operation of the invention shown in FIG. 1.

In step 302 of FIG. 3A, a sender originates a facsimile message from a facsimile device such as facsimile device 112. Device 112 may be a facsimile machine or a computer terminal equipped with a facsimile modem and facsimile software. The sender transmits a facsimile to a phone number provided to a subscriber, where the subscriber is the intended recipient of the transmission. The phone number is user specific, supplied by a facsimile-to-e-mail service provider, specifically for receiving facsimile transmission. Generally device 112 is connected to a public telephone network such as PSTN 114.

In step 304, an identification and routing process initiates for directing the facsimile transmission to an appropriate facsimile server device such as facsimile server device 120. Preferably, a switch provided by the service provider, such as switch 116, initially receives the telephone call. The switch may receive the call directly from the sender, or via the PSTN. Switch 116 may be dedicated to facsimile transmission calls only, although there is no requirement of such. Preferably, a database is associated with the switch for storing routing information for each telephone number issued by the service provider. Upon receipt of a call, the switch queries the associated database, such as NCS platform 118, for routing information.

In step 306, the database or NCS platform 118 retrieves a network routing address associated with the dialed facsimile number. The routing address is then provided to the facsimile server.

In step 308, the switch routes the facsimile transmission to the facsimile server device identified by the routing address provided in step 306. Along with the facsimile transmission, the switch also out-pulses the digits of the dialed facsimile number. The dialed facsimile number will be employed later by another database to obtain additional information associated with the service provider issued telephone number. Preferably, the facsimile transmission is received by a facsimile server module included within the facsimile server device.

In step 310, a facsimile server device, such as device 120, and preferably including a facsimile server such as server 122 within the device, receives and demodulates the facsimile transmission. The demodulated transmission is stored as an object file in a database. Preferably the database is included as part of the facsimile server device coupled to a facsimile server, such as facsimile database 124 coupled to facsimile server 122.

In step 312, the facsimile server device queries a subscriber database, such as subscriber database 126, for an e-mail address and file translation specification associated with the dialed facsimile number. The query supplies the out-pulsed digits of the dialed facsimile number from step 308 to the subscriber database. Subscriber e-mail address and file translation specifications are linked to associated telephone numbers issued by the service provider. Preferably, the subscriber database is included within the facsimile server device as is subscriber directory 126.

In step 314, using the dialed facsimile number as a key, the subscriber directory locates the e-mail address/e-mail system and file translation specification, and returns it to the facsimile server device.

In step 315 of FIG. 3B, the facsimile server device performs a file translation in accordance to the specification provided by the subscriber directory. Preferably, a facsimile server module, such as server 122, contains a variety of file translation software. If the subscriber specified format is a text format such as ASCII text, then the facsimile server preferably employs scanning software to scan the image of the native facsimile object file and convert text to standard ASCII format text. Any non-textual graphics will, of course, be lost in this conversion.

In step 316, the facsimile server creates an e-mail message directed to the subscriber e-mail address associated with the dialed facsimile number. If the translated object file is a graphic file, the facsimile server attaches the translated object file to the e-mail message. If, however, the translated object file is a text file, the facsimile may either attach the text file to the e-mail message or include the text file in the body of the e-mail message. Preferably, the facsimile server compresses the translated file for faster transfer.

In step 318, the facsimile server accesses an e-mail system with which it has an account. The facsimile server executes a message-transmit function to send the message. The facsimile server account on the e-mail server will have a distinctive name, such as "Facsimile Server", to indicate to the subscriber the origin of the e-mail message.

In step 320 a determination is made as to whether the e-mail address of the subscriber is for an account within the current e-mail system. That is, whether the e-mail system of the subscriber is supported by the e-mail server of the service provider. If yes, that is, if both the service provider and the subscriber subscribe to a common e-mail server, such as server 132, then in step 322, the e-mail message is placed in the subscriber's account. If no, then in step 324, the e-mail message is sent to the e-mail system that was designated in the subscriber directory. In this case, the subscriber directory returns an address for the e-mail system along with the subscriber's address within that e-mail system.

In step 326, the subscriber logs onto or accesses their e-mail system at their convenience, and downloads the e-mail message. The object file attachment is extracted and read using standard PC facsimile software. Where the file was compressed prior to sending, the file is un-compressed either by the subscriber e-mail system or by software on the computer terminal of the subscriber.

Figure 4A:
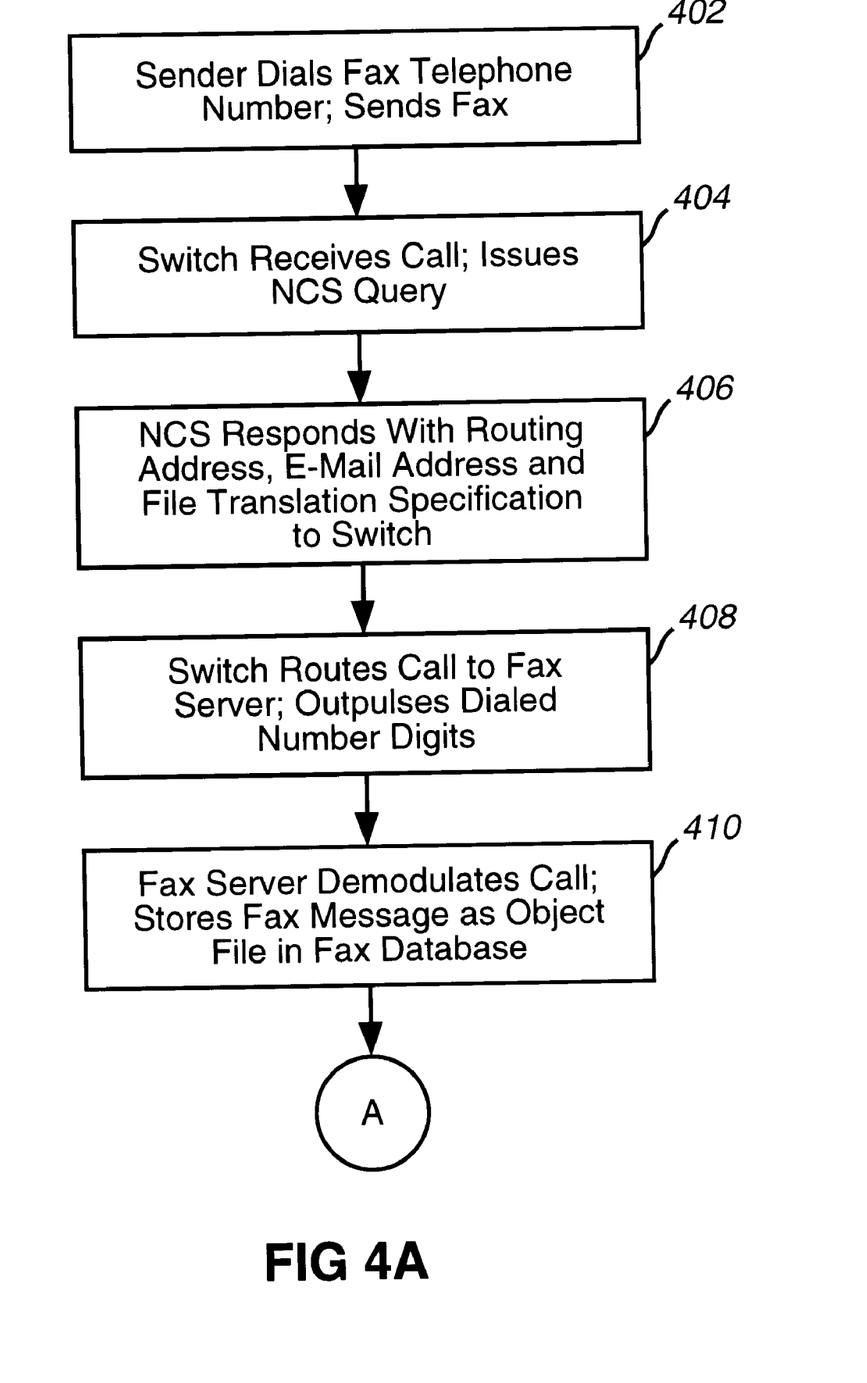
FIGS. 4A and 4B provide a sequence of events flow diagram illustrating a method of delivering facsimile transmissions to e-mail systems in accordance with an alternative embodiment of the present invention.
Figure 4B:
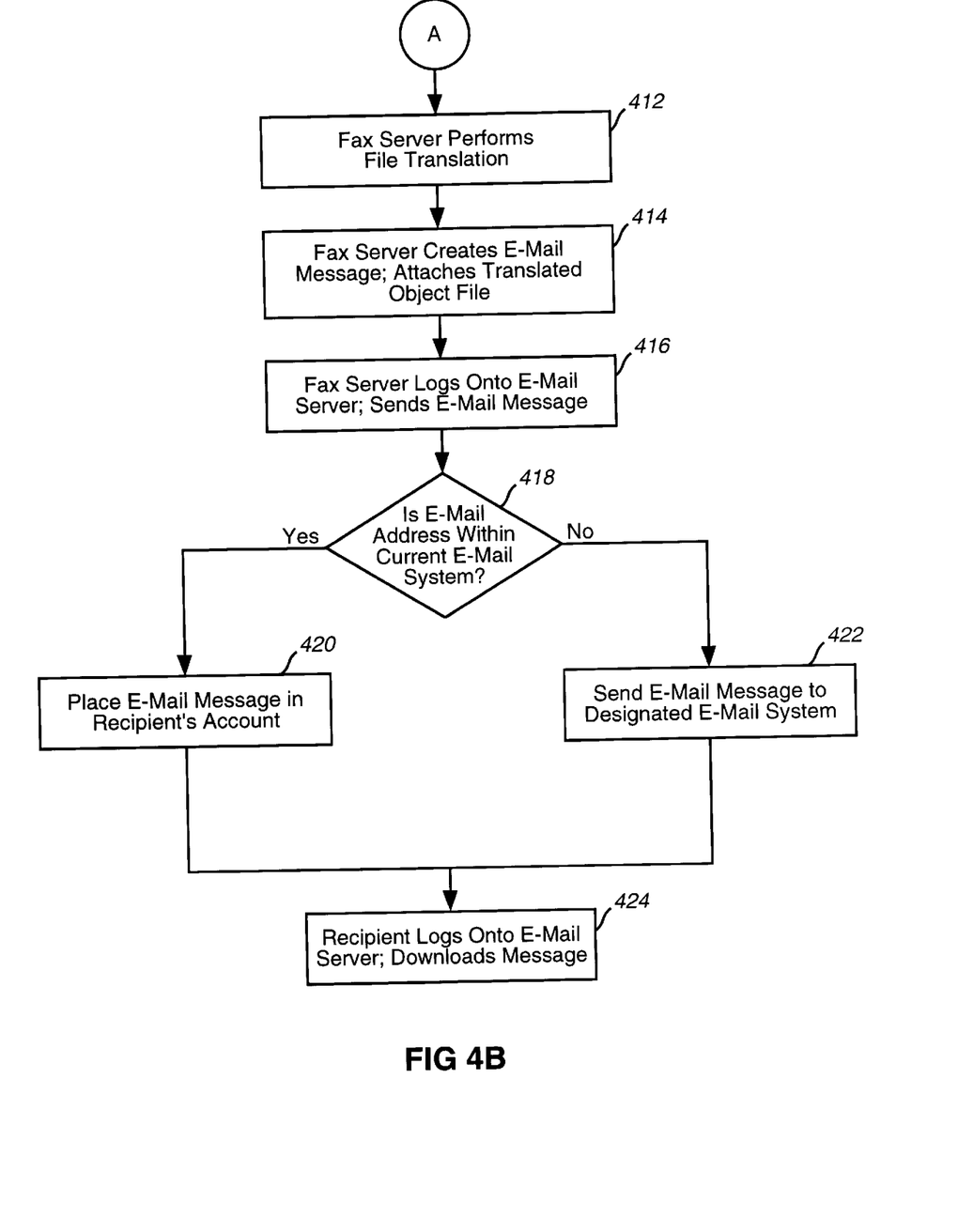

Referring to FIGS. 4A and 4B, a process flowchart is provided for the alternative embodiment where e-mail address translations are performed in NCS database 118 rather than subscriber directory 126. File translation specifications are also provided by the NCS database 118.

In step 402 of FIG. 4A, a sender originates a facsimile message with either a facsimile machine or a PC equipped with a facsimile modem and facsimile software. The sender dials the facsimile telephone number and sends the facsimile image.

In step 404, a switch of the service provider receives the call. The switch may receive the call directly from the sender, or via the PSTN. The switch then issues a query to an NCS platform.

In step 406, the NCS platform returns an e-mail address associated with the dialed number, a network routing address and a file translation specification to the Facsimile server.

In step 408, the switch routes the call to the facsimile server. The digits of the e-mail address, rather than the dialed facsimile number, are out-pulsed.

In step 410, the facsimile server demodulates the facsimile call, and stores the facsimile image as an object file in the facsimile database. Since NCS database 118 provided e-mail address and file translation specification information in step 406, there is no need to query a subscriber directory in the facsimile server device 122.

Referring to FIG. 4B, remaining steps 412–424 are substantially the same as steps 315–326, respectively, of FIG. 3B.

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and bitter equivalents.

What is claimed is:

1. A facsimile-to-electronic mail system, comprising:
    a facsimile server device including:
        a facsimile receiving device;
        means for converting a facsimile transmission to a subscriber selected format, including a facsimile server coupled to said facsimile receiving device, said facsimile server including file translation software for converting the facsimile transmission to the subscriber-selected format;
        means for transmitting a converted facsimile transmission to a subscriber electronic mail address; and
    a subscriber directory coupled to said facsimile server for storing subscriber information, for generating record formats comprising the subscriber information and for providing the record formats to said facsimile server, the subscriber information including subscriber electronic mail addresses and subscriber selected file translation formats.

2. The system of claim 1, further comprising:
    a network routing system for receiving said facsimile transmissions through subscriber-specific facsimile-receiving telephone numbers and for routing said facsimile transmissions to facsimile server devices associated with said subscriber-specific facsimile-receiving telephone numbers.

3. The system of claim 2, wherein said network routing system includes means for translating subscriber-specific facsimile-receiving telephone numbers into subscriber electronic mail addresses, said network routing system routing said electronic mail addresses with said facsimile transmissions and said subscriber-specific facsimile-receiving telephone numbers.

4. The system of claim 2, wherein said means for transmitting include means for initiating electronic mail messages to subscribers, means for attaching said converted files to said electronic mail messages and means for sending said electronic mail messages to said subscriber electronic mail addresses.

5. The system of claim 2, wherein said means for transmitting include means for initiating electronic mail messages to subscribers, means for inserting said converted text files into said electronic mail messages and means for sending said electronic mail messages to said subscriber electronic mail addresses.

6. The system of claim 2, wherein said file translation software includes graphic scanning software for reformatting facsimile transmissions into text files including ASCII text files.

7. The system of claim 2, wherein said facsimile server device includes means for changing a destination to which facsimile transmissions are to be forwarded to, said destination including at least one of:
    (i) a facsimile device;
    (ii) a telephone number: and
    (iii) an electronic mail address.

8. The system of claim 7, wherein said means include an interactive voice response unit (IVR) coupled to said facsimile server device for receiving DTMF formatted commands from the subscriber through a telephone key pad.

9. The system of claim 7, wherein said means include a voice recognition unit (VRU) coupled to said facsimile server device for receiving voice commands from the subscriber.

10. The system of claim 2, wherein said facsimile server device includes means for changing subscriber file translation specifications.

11. The system of claim 10, wherein said means include an interactive voice response unit (IVR) coupled to said facsimile server device for receiving DTMF formatted commands from the subscriber through a telephone key pad.

12. The system of claim 10, wherein said means include a voice recognition unit (VRU) coupled to said facsimile server device for receiving voice commands from the subscriber.

13. A method of reformatting a facsimile transmission to an electronic mail system comprising the steps of:
    (1) receiving a facsimile transmission through a telephone number;
    (2) storing the received facsimile transmission as an object file;
    (3) retrieving a record format associated with the telephone number, the record format including a subscriber's electronic mail address and selected file translation specification, to determine the subscriber's selected file translation specification;
    (4) converting the stored object file into a preselected file format based upon the subscriber selected file translation specification;
    (5) retrieving the record format associated with the telephone number to determine the subscriber's electronic mail address;
    (6) creating an electronic mail message from the stored object file; and
    (7) sending the electronic mail message.

14. The method of claim 13, further comprising the step of:
    (6) permitting a subscriber to select a translation format.

15. The method of claim 14, wherein step (6) comprises the step of:
    (a) permitting the subscriber to select a translation format through a telephone connection.

16. The method of claim 15, wherein step (6)(a) comprises permitting the subscriber to select at least one of the following software formats:
    (a) Microsoft Powerpoint;
    (b) Lotus Freelance;
    (c) Visio;
    (c) Corel Draw;
    (d) JPEG;
    (e) Microsoft Paintbrush; and
    (f) standard bit map formats.

17. The method of claim 13, further comprising the step of:

(6) permitting a subscriber to change a destination address.

18. The method of claim 17, wherein step (6) comprises the step of:

(a) permitting a subscriber to change a destination address through a telephone connection.

19. The method of claim 18, wherein step (6)(a) comprises permitting a subscriber to change a destination address to another electronic mail address.

20. The method of claim 18, wherein step (6)(a) comprises permitting a subscriber to change a destination address to a facsimile telephone number.

\* \* \* \* \*

(12) EX PARTE REEXAMINATION CERTIFICATE (9670th)
United States Patent
Freeman (10) Number: US 6,020,980 C1
(45) Certificate Issued: May 20, 2013

(54) FACSIMILE DELIVERY TO ELECTRONIC MAIL

(75) Inventor: Michael B. Freeman, Colorado Springs, CO (US)

(73) Assignee: J2 Global, Inc., Hollywood, CA (US)

Reexamination Request:
No. 90/012,650, Sep. 14, 2012

Reexamination Certificate for:
Patent No.: 6,020,980
Issued: Feb. 1, 2000
Appl. No.: 08/723,750
Filed: Sep. 30, 1996

(51) Int. Cl.
*H04L 12/58* (2006.01)
*H04N 1/00* (2006.01)
*H04N 1/32* (2006.01)

(52) U.S. Cl.
USPC .................. 358/402; 379/100.08; 379/100.13; 379/93.24

(58) Field of Classification Search
None
See application file for complete search history.

(56) References Cited

To view the complete listing of prior art documents cited during the proceeding for Reexamination Control Number 90/012,650, please refer to the USPTO's public Patent Application Information Retrieval (PAIR) system under the Display References tab.

*Primary Examiner* — Linh M. Nguyen (57) ABSTRACT

A system and method is provided for delivering facsimile messages to electronic mail addresses as object files attached to or inserted within e-mail messages. A facsimile server device is provided with a facsimile modem for receiving facsimile calls. The facsimile server device includes various application file translation software programs for translating the facsimile object files to subscriber selected formats. In operation, an e-mail subscriber also subscribes to a facsimile-delivery-to-electronic-mail system and is issued a specially designated phone number for receiving facsimile transmissions. The subscriber selects a file translation format in accordance with a software application program which the subscriber uses. The facsimile server device receives and demodulates the facsimile transmission and stores it as an object file in the native facsimile format. The facsimile server device then queries a subscriber database for translation of the dialed phone number to an e-mail address. The subscriber database query also provides a subscriber selected file format which the facsimile file is to be translated into prior to sending to the subscriber. The facsimile server device creates an e-mail message addressed to the e-mail address and translates the native facsimile object file to the format file specified by the subscriber database. The facsimile server device attaches the translated object file to the electronic mail message, or inserts it within, and sends the electronic mail message to the subscriber.

US 6,020,980 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 and 13 is confirmed.

Claims 5, 7-9, 11, 12 and 14-20 are determined to be patentable as amended.

New claims 21-36 are added and determined to be patentable.

Claims 2-4, 6 and 10 were not reexamined.

5. The system of claim 2, wherein said means for transmitting include means for initiating electronic mail messages to subscribers, means for inserting [said] converted text files into said electronic mail messages and means for sending said electronic mail messages to said subscriber electronic mail addresses.

7. The system of claim 2, wherein said facsimile server device includes means for changing a destination to which facsimile transmissions are to be forwarded to, said destination including at least one of:
  (i) a facsimile device;
  (ii) a telephone number[:]; *and*
  (iii) an electronic mail address.

8. The system of claim 7, wherein said means *for changing a destination to which the facsimile transmissions are to be forwarded to* include an interactive voice response unit (IVR) coupled to said facsimile server device for receiving DTMF formatted commands from the subscriber through a telephone key pad.

9. The system of claim 7, wherein said means *for changing a destination to which the facsimile transmissions are to be forwarded to* include a voice recognition unit (VRU) coupled to said facsimile server device for receiving voice commands from the subscriber.

11. The system of claim 10, wherein said means *for changing subscriber file translation specifications* include an interactive voice response unit (IVR) coupled to said facsimile server device for receiving DTMF formatted commands from the subscriber through a telephone key pad.

12. The system of claim 10, wherein said means *for changing subscriber file translation specifications* include a voice recognition unit (VRU) coupled to said facsimile server device for receiving voice commands from the subscriber.

14. The method of claim 13, further comprising the step of:
  [(6)] (*8*) permitting a subscriber to select a translation format.

15. The method of claim 14, wherein step [(6)] (*8*) comprises the step of:
  (a) permitting the subscriber to select a translation format through a telephone connection.

16. The method of claim 15, wherein step [(6)(a)] (*8*)(*a*) comprises permitting the subscriber to select at least one of the following software formats:

(a) Microsoft Powerpoint;
(b) Lotus Freelance;
(c) Visio;
[(c)] (*d*) Corel Draw;
[(d)] (*e*) JPEG;
[(e)] (*f*) Microsoft Paintbrush; and
[(f)] (*g*) standard bit map formats.

17. The method of claim 13, further comprising the step of:
  [(6)] (*8*) permitting a subscriber to change a destination address.

18. The method of claim 17, wherein step [(6)] (*8*) comprises the step of:
  (a) permitting a subscriber to change a destination address through a telephone connection.

19. The method of claim 18, wherein step [(6)(a)] (*8*)(*a*) comprises permitting a subscriber to change a destination address to another electronic mail address.

20. The method of claim 18, wherein step [(6)(a)] (*8*)(*a*) comprises permitting a subscriber to change a destination address to a facsimile telephone number.

*21. A facsimile-to-electronic mail system, comprising:*
  *a facsimile server device including:*
    *a facsimile receiving device;*
    *means for converting a facsimile transmission to a subscriber selected format, including a facsimile server coupled to said facsimile receiving device, said facsimile server including file translation software for converting the facsimile transmission to the subscriber selected format, said subscriber selected format including at least one of the following software formats: Microsoft PowerPoint, Lotus Freelance, Visio, Corel Draw, JPEG, and Microsoft Paintbrush;*
    *means for transmitting a converted facsimile transmission to a subscriber electronic mail address; and*
  *a subscriber directory coupled to said facsimile server for storing subscriber information, for generating record formats comprising the subscriber information and for providing the record formats to said facsimile server, the subscriber information including subscriber electronic mail addresses and subscriber selected file translation formats.*

*22. A facsimile-to-electronic mail system, comprising:*
  *a facsimile server device including:*
    *a facsimile receiving device;*
    *means for converting a facsimile transmission to a subscriber selected format, including a facsimile server coupled to said facsimile receiving device, said facsimile server including file translation software for converting the facsimile transmission to the subscriber selected format, the subscriber selected format including a text file;*
    *means for transmitting a converted facsimile transmission to a subscriber electronic mail address; and*
  *a subscriber directory coupled to said facsimile server for storing subscriber information, for generating record formats comprising the subscriber information and for providing the record formats to said facsimile server, the subscriber information including subscriber electronic mail addresses and subscriber selected file translation formats.*

*23. The system of claim 22, wherein the text file is attached to the electronic mail message.*

*24. The system of claim 22, wherein the text file is inserted into the body of the electronic mail message.*

*25. A method of reformatting a facsimile transmission to an electronic mail system comprising the steps of:*

(1) receiving a facsimile transmission through a telephone number;
(2) storing the received facsimile transmission as an object file;
(3) retrieving a record format associated with the telephone number, the record format including an e-mail distribution list of a plurality of subscribers' and selected file translation specification for each of the plurality of subscribers, to determine the subscribers' selected file translation specifications;
(4) converting the stored object file into preselected file formats based upon the subscriber selected file translation specifications;
(5) retrieving the record format associated with the telephone number to determine the subscribers' electronic mail addresses associated with the e-mail distribution list;
(6) creating electronic mail messages from the stored object file; and
(7) sending the electronic mail message to the plurality of subscribers.

26. A facsimile-to-electronic mail system, comprising:
a facsimile server device including:
a facsimile receiving device;
means for converting a facsimile transmission to a plurality of subscriber selected formats, including a facsimile server coupled to said facsimile receiving device, said facsimile server including file translation software for converting the facsimile transmission to the subscriber-selected formats;
means for transmitting a converted facsimile transmission to a subscriber electronic mail address; and
a subscriber directory coupled to said facsimile server for storing subscriber information, for generating record formats comprising the subscriber information and for providing the record formats to said facsimile server, the subscriber information including subscriber electronic mail addresses and subscriber selected file translation formats.

27. The system of claim 26, wherein the facsimile transmission is sent to a plurality of email addresses associated with an e-mail distribution list stored in the subscriber directory.

28. The system of claim 1, wherein the subscriber directory stores a designated phone number assigned by a service provider to the subscriber.

29. The system of claim 21, wherein the subscriber directory stores a designated phone number assigned by a service provider to the subscriber.

30. The system of claim 22, wherein the subscriber directory stores a designated phone number assigned by a service provider to the subscriber.

31. A facsimile-to-electronic mail system, comprising:
a facsimile server device including:
a facsimile receiving device;
means for converting a facsimile transmission from a native facsimile object file to a subscriber selected format, including a facsimile server coupled to said facsimile receiving device, said facsimile server including file translation software for converting the facsimile transmission to the subscriber selected format;
means for transmitting a converted facsimile transmission to a subscriber electronic mail address; and
a subscriber directory coupled to said facsimile server for storing subscriber information, for generating record formats comprising the subscriber information and for providing the record formats to said facsimile server, the subscriber information including subscriber electronic mail addresses and subscriber selected file translation formats;
wherein the subscriber selected format is a format associated with a graphics application program.

32. The system of claim 31, wherein the format associated with a graphics application program is selected by the subscriber based on available applications available to the subscriber on the system accessing the converted facsimile transmission.

33. The system of claim 31, wherein the format associated with a graphics application program is a format other than a text file and other than an image file.

34. The system of claim 31, wherein the converted facsimile is transmitted without transmitting the native facsimile object file.

35. A facsimile-to-electronic mail system, comprising:
a facsimile server device including:
a facsimile receiving device;
means for converting a facsimile transmission to a subscriber selected format, including a facsimile server coupled to said facsimile receiving device, said facsimile server including file translation software for converting the facsimile transmission to the subscriber-selected format;
means for transmitting a converted facsimile transmission to a subscriber electronic mail address; and
a subscriber directory coupled to said facsimile server for storing subscriber information, for generating record formats comprising the subscriber information and for providing the record formats to said facsimile server, the subscriber information including subscriber electronic mail addresses and subscriber selected file translation formats;
wherein the subscriber-selected format is received directly from the subscriber.

36. A method of reformatting a facsimile transmission to an electronic mail system comprising the steps of:
(1) receiving from a subscriber a selection of a subscriber's selected format;
(2) storing the subscriber's selected format;
(3) receiving a facsimile transmission through a telephone number associated with the subscriber;
(4) storing the received facsimile transmission as an object file;
(5) retrieving a record format associated with the telephone number, the record format including the subscriber's electronic mail address and selected file translation specification, said file translation specification associated with said subscriber's selected format, to determine the subscriber's selected file translation specification;
(6) converting the stored object file into a preselected file format based upon the subscriber selected file translation specification;
(7) retrieving the record format associated with the telephone number to determine the subscriber's electronic mail address;
(8) creating an electronic mail message from the stored object file; and
(9) sending the electronic mail message.

* * * * *